INVENTORS
WILLIAM L. FRY
KAZIMER A. STRZALA
BY
Rule & Hoge
ATTORNEYS

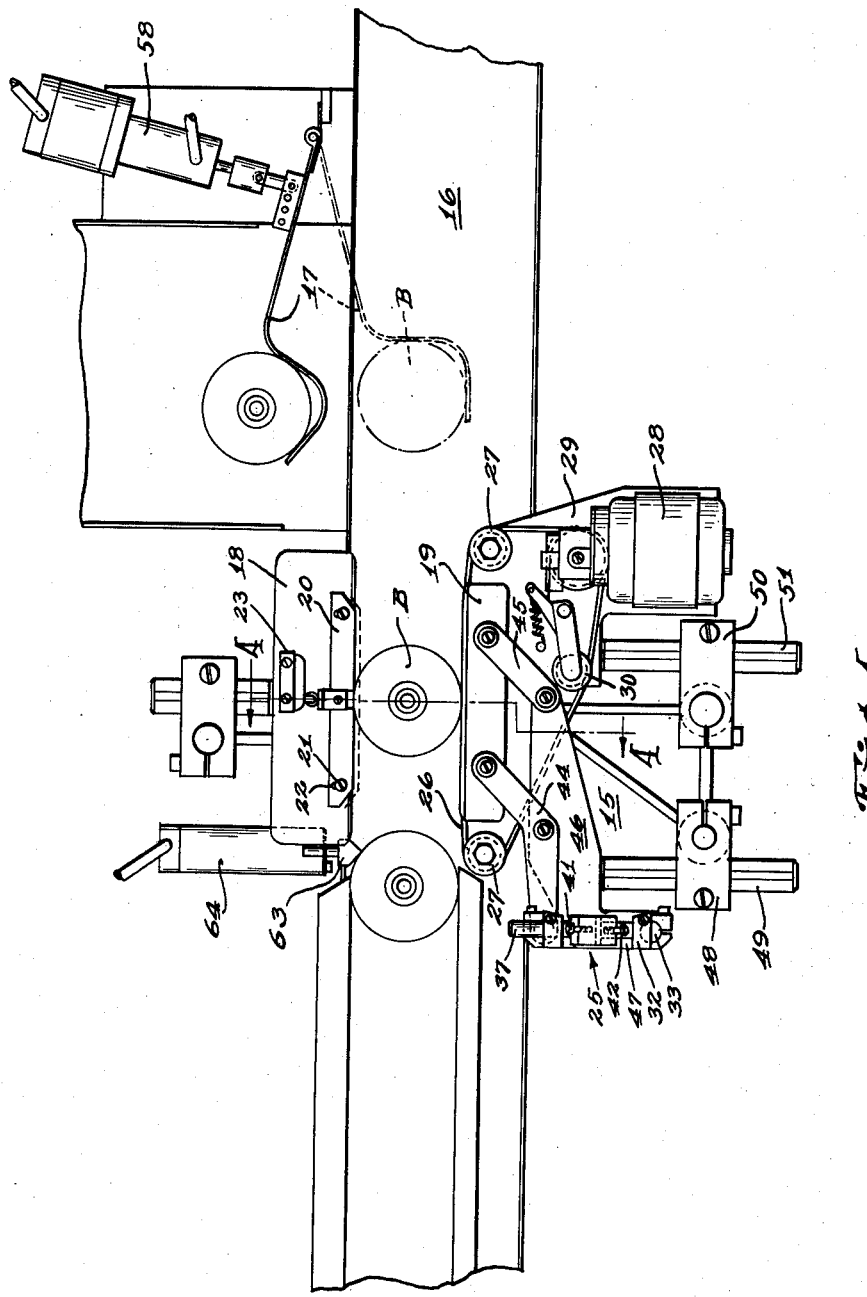

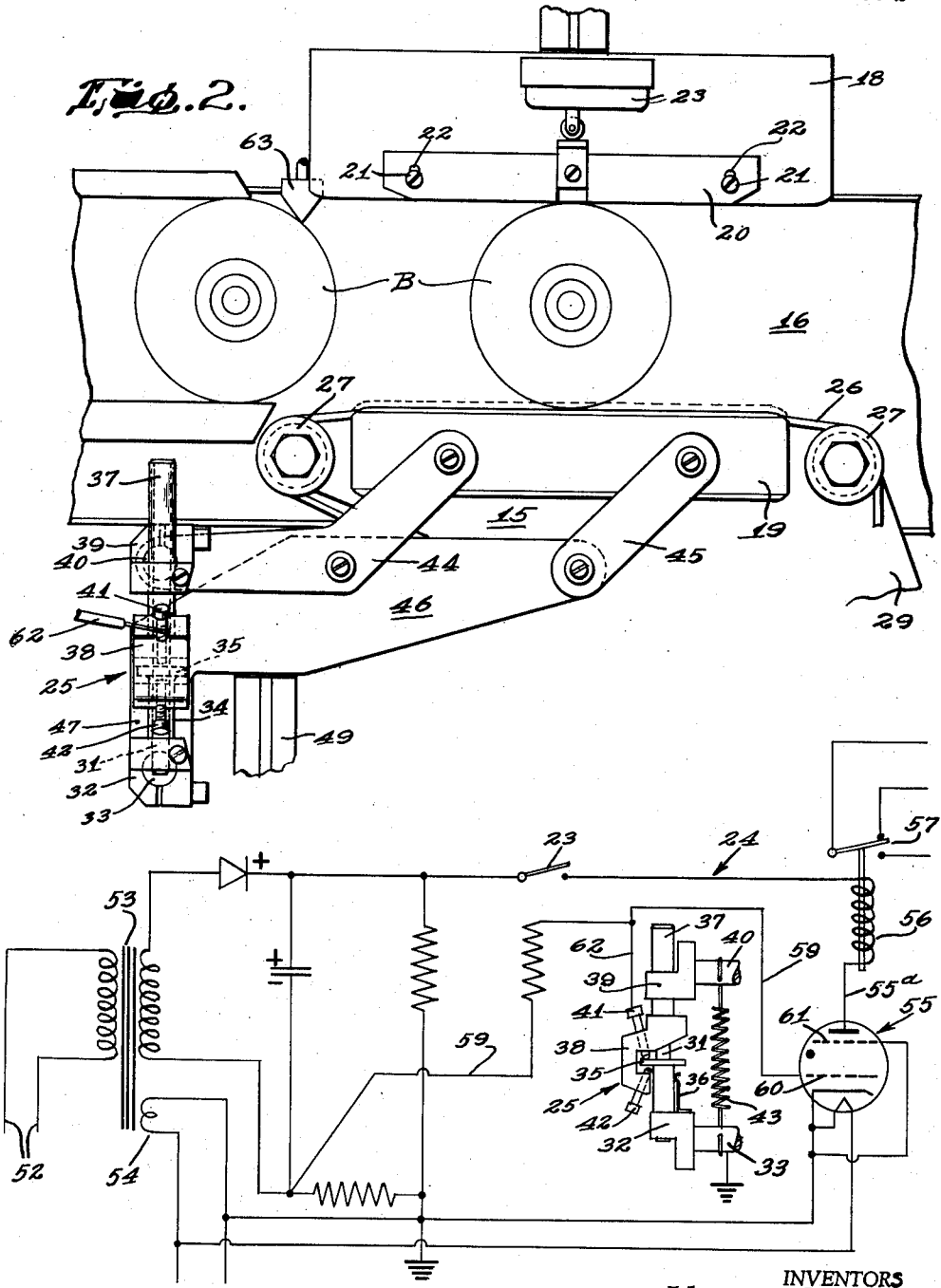

United States Patent Office
3,076,268
Patented Feb. 5, 1963

3,076,268
GAUGING APPARATUS
William L. Fry, Lafayette, and Kazimer A. Strzala, Walnut Creek, Calif., assignors to Owens-Illinois Glass Company, a corporation of Ohio
Filed Nov. 24, 1958, Ser. No. 775,751
3 Claims. (Cl. 33—143)

The present invention relates to gauging apparatus. In bottles and jars it is most important that any "out-of-round" condition be closely controlled to the end that they may be satisfactorily decorated or labeled and later sealed with suitable closure caps. If the "out-of-round" condition is excessive the containers cannot uniformly contact the glue and label applying rolls or the stencil screen of a decorating apparatus. Also, in such circumstances, the closure caps, in all probability, cannot be affixed. There is a limit to which these closure caps can be distorted to compensate for the described "out-of-round" condition and still perform their intended function effectively. Beyond that they generally cannot be applied at all, and if the closure caps are formed of thermosetting plastic material, they frequently fracture.

An object of our invention is the provision of means for detecting any extreme "out-of-round" condition in a bottle, jar or the like article and rejecting same before it reaches the decorating or labeling stage.

A further important object of our invention is the provision of simple means for in effect measuring the difference between the actual maximum and minimum dimensions of articles without reference to any specific diametrical dimension, assuming the articles to be bottles or jars, for example, and rejecting those articles in which such dimensional difference exceeds a previously selected, though adjustable limit.

A further object of our invention is the provision of automatic means operating in response to the detection of a predetermined degree of difference between the maximum and minimum diameter of a cylindrical object or thickness of other objects to reject or eject same.

Other objects will be in part apparent and in part pointed out hereinafter.

In the drawings:

FIG. 1 is a top plan view showing our gauging apparatus associated with a horizontal article conveyor.

FIG. 2 is a detail top plan view of a portion of the apparatus shown in FIG. 1.

FIG. 3 is a wiring diagram.

Figure 4:
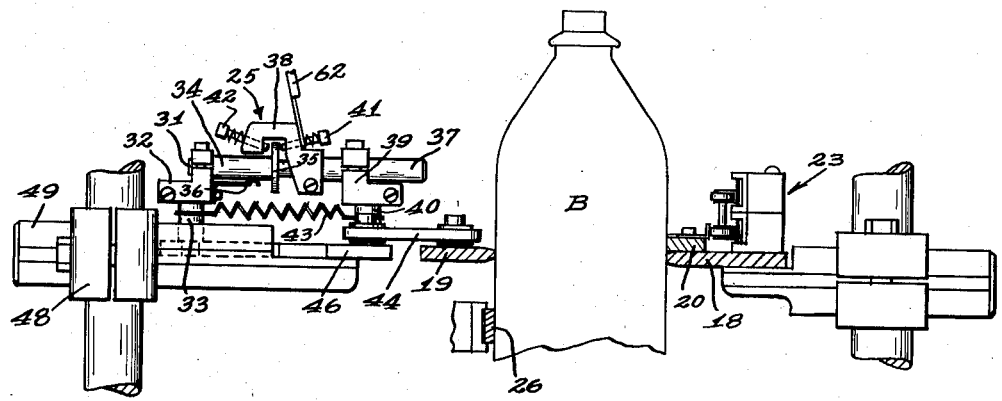
FIG. 4 is a partial sectional view taken along the plane of line 4—4 of FIG. 1 showing the differential slide elements in their normal neutral positions.

In the illustrated embodiment of our invention, it is being used for gauging round or cylinder-like bottles and is operable to reject or eject from the production line any bottles, or similar articles, in which the difference between the maximum and minimum diameter exceeds a predetermined variable standard. As is apparent, or will be hereinafter, articles other than round bottles, etc., can be gauged by this apparatus.

As disclosed herein the gauging apparatus 15 is associated with a horizontal conveyor 16 which may move continuously and thereby bring the bottles B to the gauging apparatus in the test zone, convey them through the test or gauging zone and finally on to a packing station (not shown) unless they are defective and removed from the conveyor by a take-out arm 17. These bottles are brought in succession to the gauging apparatus by the conveyor and move one at a time into and through the testing zone, the line of bottles following that bottle actually being gauged, being momentarily held stationary by means of an automatically actuated stop 63 (FIGS. 1 and 2), projection of which is suitably timed or synchronized with other operations. While in the test zone, the bottle is positively rotated about its axis as it advances with the conveyor 16. Any excessive eccentricity, or "out-of-roundness" of the specific surface to be gauged, will, as the bottle rotates in contact with an element of the apparatus, actuate an electrical contact or switch device in such fashion that if the difference between the maximum and minimum diameter exceeds a predetermined, though variable, standard, said switch closes an electric circuit and causes operation of the take-out arm 17. If, however, the difference referred to is below the set standard, the switch remains open and the bottle is carried on to the packing station.

Specifically the gauging apparatus 15 which functions in the above indicated fashion, comprises the following elements, which, insofar as the article handling aspects are concerned, are disclosed in detail in copending application of Kazimer A. Strzala, Serial Number 629,356, filed December 19, 1956, now Patent Number 2,937,749 entitled, "Article Gauging and Selecting Apparatus." As each bottle enters the testing or gauging zone it immediately makes contact with a back-up bar 18 and gauging bar 19 which extend horizontally along opposite sides of the path of bottle travel. Immediately above the back-up bar 18 and mounted thereupon is a cycle-bar 20 which is free for limited movement toward and away from the path of travel of the bottles. Such free movement is permitted by the stud bolts 21 and elongated slots 22 which provide sliding connection between the cycle-bar and back-up bar. Outward movement of this cycle-bar under pressure of a bottle closes a normally open microswitch 23 in an electric circuit 24 including a gauging or detector switch 25 which normally is closed but is opened just prior to closing of the microswitch 23 and reclosed later only by a defective article. This cycle-bar is of sufficient length to insure holding the switch 23 closed during the entire period of time a bottle is in the testing zone.

In testing or gauging an article, it must be rotated and for this purpose we provide an endless belt 26 which is trained over pulleys 27 and driven by a motor 28 (FIG. 1), the latter mounted upon a platform 29. Preferably this belt in part is just below the gauging bar 19 (FIG. 4). A tension or take-up pulley 30 maintains the belt sufficiently tight to perform its function of rotating the bottle, or such article, while it advances in contact with the gauging bar 19.

Transverse movement of the gauging bar 19, as induced by excessive eccentricity or "out-of-roundness" of a selected annular surface area of the bottle, determines whether the detector or gauging switch 25 closes and causes rejection of the bottle, or instead remains open and allows the bottle to move on to the packing station. The extent of such movement of this gauging bar is the controlling factor and that in turn is determined by the degree of eccentricity of the bottle. Obviously if the article is other than cylindrical, variations in the relative spacing of opposed longitudinal surfaces for example may well determine the extent of lateral movement of the gauging bar 19 and finally whether the detector switch remains open, or closes, instead.

This detector or gauging switch 25 is quite similar to that shown in our U.S. Patent Number 2,689,409 issued September 21, 1954, entitled, "Gauging Mechanism." In the present apparatus, however, the switch device has been modified so that it detects only differences between the maximum and minimum diameters without regard for any specific diametrical dimension. The importance of these differences has been pointed out above. Structurally this switch 25 (FIGS. 5 and 6) comprises a fixed guide rod 31 anchored at one end in a fixed bracket 32 which is secured to the upper end of a supporting post 33. A metal contact sleeve 34 is slidable on the guide rod near the bracket 32, said sleeve being formed with a contact disk 35 at that end remote from the bracket. A leaf spring 36 carried by the bracket extends alongside the sleeve 34 with its free end yieldingly contacting the latter under sufficient pressure to hold said sleeve in any position along the rod, against accidental or undesired premature axial shifting. A carrier tube 37 for an electrical contact supporting yoke 38 is slidable upon the aforementioned guide rod 31 and is anchored in a bracket 39 which is mounted upon a post 40. The yoke 38 is formed of insulating material and straddles the contact disk 35. An electric contact element 41 is carried by the yoke, such being an adjustable screw which is threaded through one arm of said yoke and capable of engagement with that face of the contact disk 35 remote from the sleeve 34. An adjustable stop 42, in the form of a screw which is threaded through the other arm of the yoke 38, is intended for contact with the other face of said disk 35 at certain times, as will be explained presently.

Figure 5:
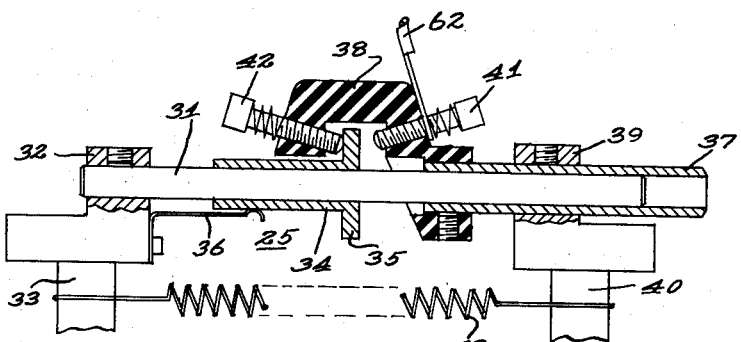
FIG. 5 is a detail sectional elevational view of the differential slide with the movable electrical contact in the position determined by the maximum diameter of the particular container being gauged.
Figure 6:
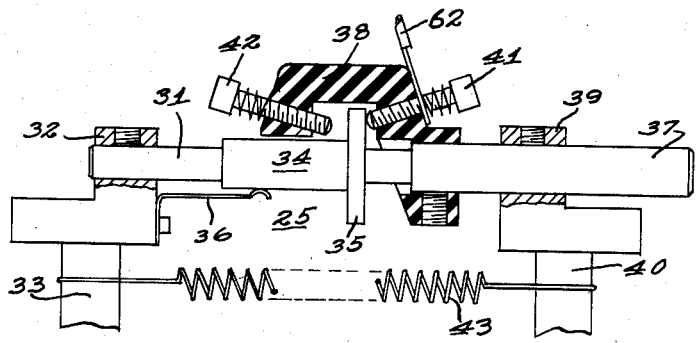
FIG. 6 is a view similar to FIG. 5 with the electrical contact in its innermost position, such being determined by the minimum diameter of the specific container being gauged.

The yoke 38 and its carrier tube 37 together with the contacts 41 and 42 are shiftable axially of said tube in varying degrees as determined by the extent of "out-of-roundness" of the bottle or jar surface being gauged. A coil spring 43 connecting the bracket carrying posts 33 and 40 normally yieldingly holds the parts of the gauging switch 25 positioned as shown in FIGS. 3 and 4 and holds the gauging bar 19 projected for contact with the article being gauged. Lateral shifting of the gauging bar 19 under the influence of a rotating bottle or jar in contact therewith, assuming the latter to be "out-of-round" to some degree, causes relative axial movement of the gauging switch elements substantially as indicated in FIGS. 5 and 6. For this purpose, the gauging bar 19 has pivoted thereto a bell-crank lever 44 and a link 45, the former being fulcrumed upon a stationary plate 46 and pivoted beyond the fulcrum to the bracket carrying post 40, this being the movable post of the switch 25. The link 45 also is pivoted to the plate 46. This plate 46 supports the switch 25 and for this purpose has a forward extension 47 in which the bracket carrying post 33 is mounted. Thus a parallel link connection is provided between the gauging bar 19 and switch 25.

The switch supporting plate 46 (FIG. 1) is connected by a slide block 48 to a guide rod 49 and in much the same fashion the motor carrying platform 29 is connected through a slide block 50 to a guide rod 51. Thus the elements carried by the plate and platform may be adjusted as required by the general dimensions of the specific articles being gauged.

The electric circuitry involved is shown in FIG. 3. The power supply is, or may be, conventional, as illustrated, including mains 52 connected to a suitable source of alternating current. From these mains, current is supplied to the transformers 53 and 54 and thence to the various control devices including the aforementioned microswitch 23, detector or gauging switch 25, thyratron tube 55 and a relay solenoid 56 in the plate circuit 55$^a$ of the thyratron, said solenoid operating a relay switch 57. This latter switch 57, when closed, operates an air pressure valve (not shown) of known type, (a solenoid valve for example) which in turn controls operation of the takeout arm actuating air motor 58. A negative voltage is supplied through lead 59 to the first control grid 60 of the thyratron tube 55 sufficient to normally prevent the tube from conducting. The second control grid 61, as shown, is grounded. A lead 62 is connected to the contact element 41 of the gauging switch 25.

With the apparatus in operation, the conveyor 16 brings the bottles B in succession to the testing zone. A stop 63 is actuated automatically by an air motor 64 or the like to momentarily hold back the line of bottles while one in the testing zone is being gauged. Immediately upon entering this zone the bottles move the gauging bar 19 sufficiently to break contact between the contact element 41 (FIGS. 3 and 4) and the contact disk. The bottle also engages the belt 26 and is thereby rotated about its axis as it advances with the conveyor 16. Next the bottle contacts the cycle bar 20 and fixed back-up bar 18, moving the former laterally to close the microswitch 23.

Assuming the surface of the bottle which is in rolling contact with the gauging bar to be excessively "out-of-round," and since the back-up bar 18 prevents lateral shifting of the bottle away from said gauging bar, it is apparent that the latter must move outwardly when engaged by the surface of maximum diameter. This operates the bell-crank lever 44 and moves the yoke carrying tube 37 (FIGS. 4, 5 and 6) and with it the contact element 41 and stop 42 away from the fixed bracket 32 a distance determined by the maximum diameter of the surface being gauged. Incident to such movement of the yoke and tube a predetermined extent, the stop screw 42 (FIG. 5) engages the contact disk 35, pulling the latter away from the fixed bracket 32. The leaf spring 36 holds the contact disk in such position pending completion of the testing cycle. Continued rotation of the bottle brings the area of minimum diameter of the surface being tested into contact with the gauging bar 19. Thereupon, under influence of the coil spring 43, this bar moves toward the bottle axis (FIG. 6) and the yoke 38, electrical contact element 41 and the carrier tube, with the bracket 39 are moved by the lever 44 toward and relative to the contact disk 35. If the difference between the maximum and minimum diameters exceeds a predetermined tolerable amount, the contact element 41 engages the contact disk 35. Thus the electrical circuit is closed, the thyratron tube conducts, thereby energizing the relay solenoid 56 and closing the switch 57. The take-out arm 17 then is actuated to remove the bottle which has proved to be excessively "out-of-round." With movement of the bottle out of contact with the bars, they are returned automatically to their normal position with the microswitch 23 open and the gauging switch elements again positioned as shown in FIGS. 3 and 4. Thus, the gauging or testing cycle is completed. Obviously, if the bottle is not excessively deformed, the control devices will not be actuated as described and the take-out arm will remain in its retracted position.

In the event the article being tested is one having opposed surfaces which are intended to be parallel and it is desired to gauge such article automatically to determine whether these surfaces are within specified limits as to parallelism, such article would be carried through the testing zone, with or without the belt 26 and the cycle heretofore described would be performed.

Modifications may be resorted to within the spirit and scope of the appended claims.

We claim:

1. A gauging switch including a pair of opposed brackets, one of which is fixed and the other movable toward and away from the fixed bracket, a guide rod on the fixed bracket, a carrier tube on the other bracket telescoped over and slidable upon the guide rod, a first electrical contact secured to the carrier tube and movable therewith along said rod, a second electrical contact slidable along the rod between the first contact and the fixed bracket and relative to which the first contact is movable along said rod, means movable with the carrier tube for moving the second contact away from the fixed bracket and spring means for releasably holding the second contact in the position to which it has been moved by the carrier tube moving means.

2. For use in gauging and detecting differences exceeding a predetermined degree between the maximum and minimum exterior diameter of a selected annular zone of a generally cylindrical article, a gauging switch including a pair of opposed brackets, one of which is fixed and the other movable toward and away from the fixed bracket, a guide rod on the fixed bracket, a carrier tube on the other bracket telescoped over and slidable upon the guide rod, a first electrical contact secured to the carrier tube and movable therewith along said rod, a second electrical contact slidable along the rod between the first contact and the fixed bracket, and relative to which the first contact is movable along said rod, means movable with the carrier tube for moving the second contact away from the fixed bracket and spring means for releasably holding the second contact in the position to which it has been moved by the carrier tube moving means, the second electrical contact being a sleeve having a contact disk at one end, and the spring means being a leaf spring carried by the fixed bracket and having a free end in frictional restraining contact with the sleeve.

3. Apparatus as defined in claim 2, the means movable with the carrier tube being a yoke carrying the first contact and straddling the second contact and a stop on said yoke engageable with the latter whereby to slidingly interengage the yoke and second contact at times.

References Cited in the file of this patent

UNITED STATES PATENTS

| | | |
|---|---|---|
| 2,352,091 | Fedorchak et al. | June 20, 1944 |
| 2,407,062 | Darrah | Sept. 3, 1946 |
| 2,542,090 | Lorenz | Feb. 20, 1951 |
| 2,584,714 | Kirkpatrick | Feb. 5, 1952 |
| 2,689,409 | Fry et al. | Sept. 21, 1954 |
| 2,748,936 | Arlin | June 5, 1956 |
| 2,873,854 | Dapp et al. | Feb. 17, 1959 |
| 2,937,749 | Strzala | May 24, 1960 |